Patented Oct. 8, 1929

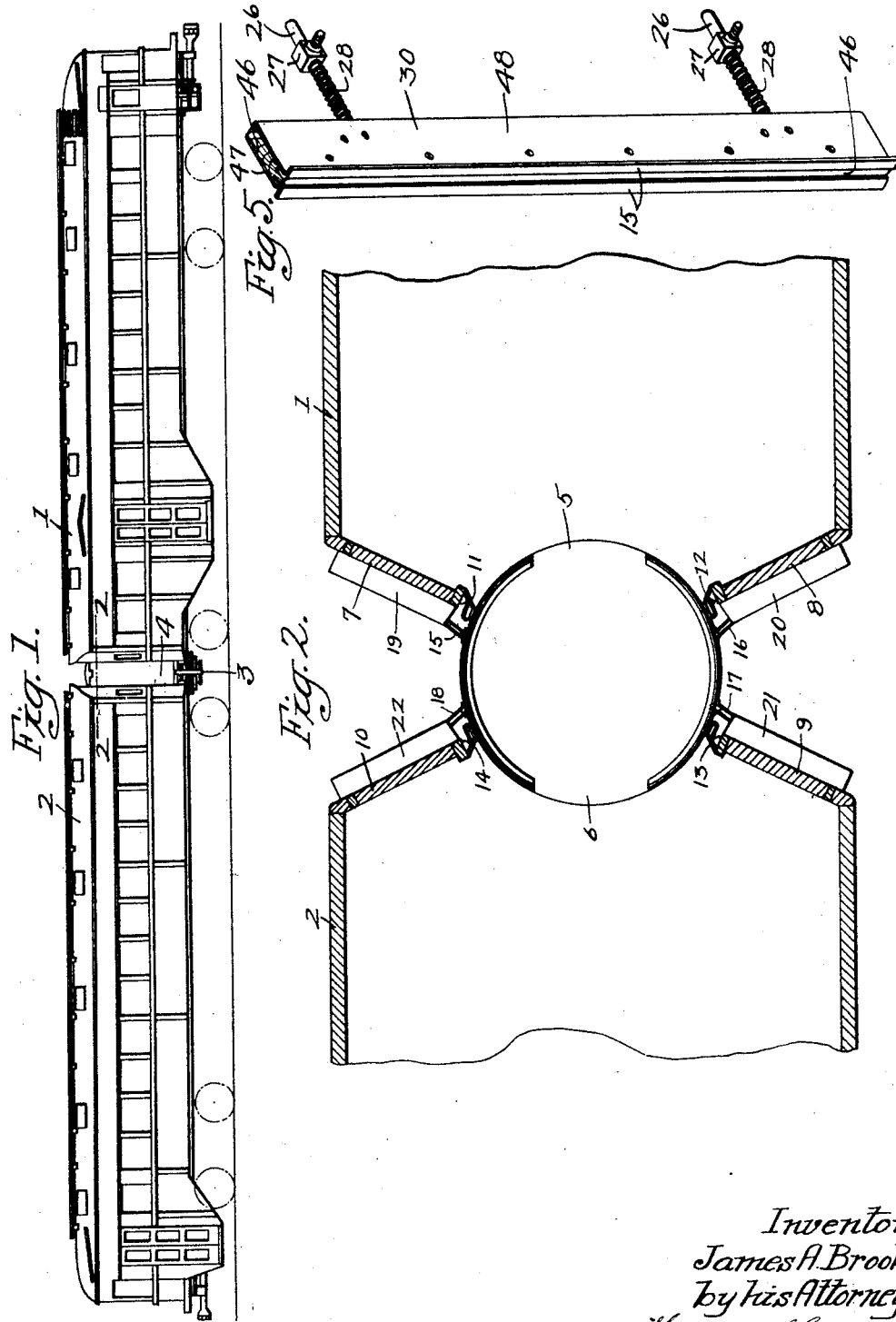

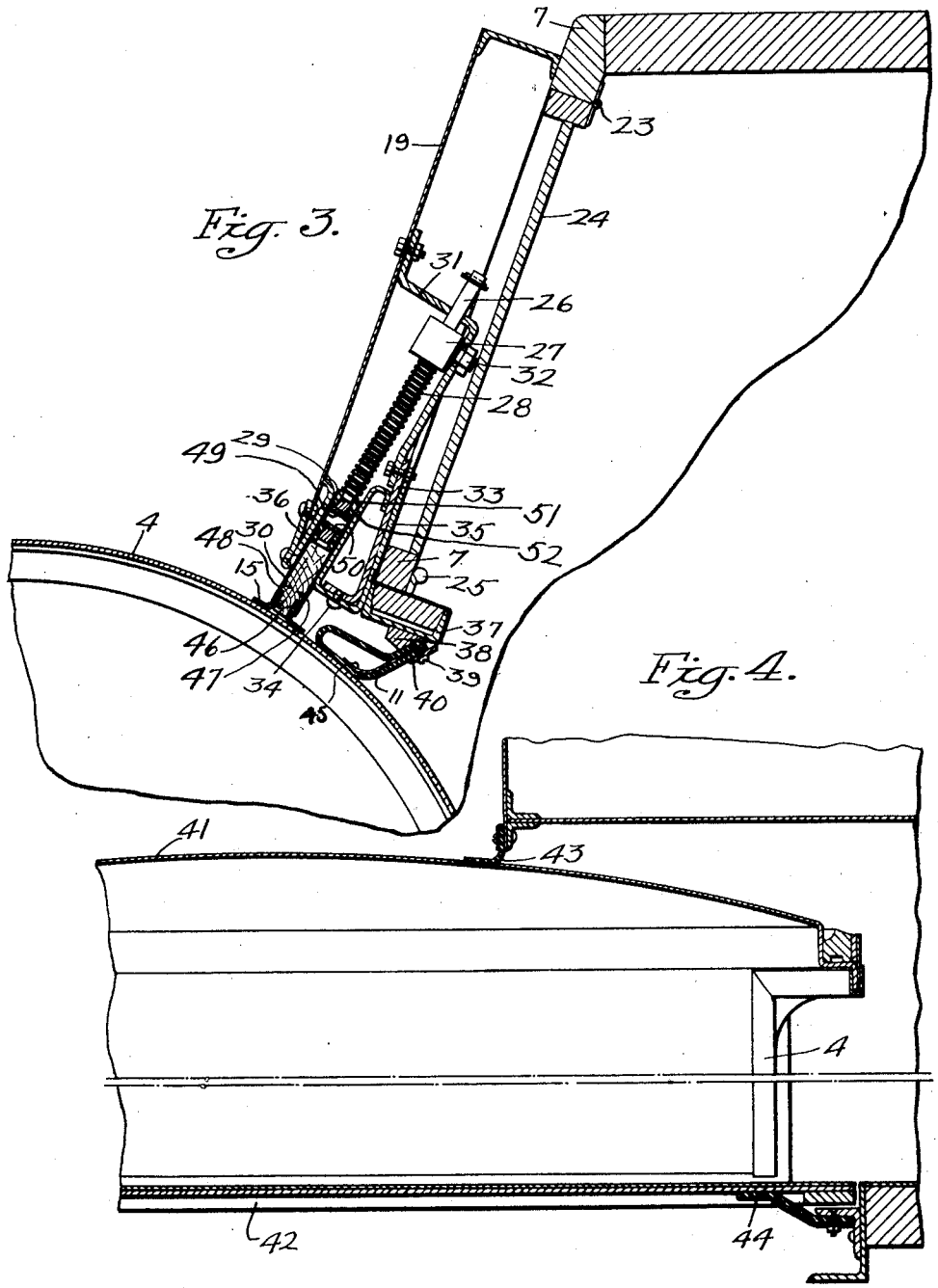

1,731,122

UNITED STATES PATENT OFFICE

JAMES A. BROOKS, OF KIRKLYN, PENNSYLVANIA, ASSIGNOR TO THE J. G. BRILL COMPANY, OF PHILADELPHIA, PENNSYLVANIA, A CORPORATION OF PENNSYLVANIA

ARTICULATED CAR

Application filed October 31, 1928. Serial No. 316,127.

An object of my invention is to provide an articulated car with improved weather-proofing devices between the two sections of the car and the connecting vestibule.

A further object of the invention is to provide spring-pressed closing strips on the sections of a car which yieldingly press against the walls of the vestibule.

A further object of the invention is to weather-proof the side, top and bottom of the joints between the sections of the car and the vestibule.

A still further object is to close the openings with two strips, with the strip having wipers, and a second wiper carried by the car body back of the first wiper.

Other objects will appear hereinafter.

In the drawings which illustrate one form of my invention,

Fig. 1 is a side elevation of an articulated car embodying my invention;

Fig. 2 is a sectional plan view on the line 2—2 of Fig. 1; showing details of the weather-proofing device;

Fig. 3 is an enlarged fragmentary transverse section illustrating in detail the form of spring-pressure means employed;

Fig. 4 is a vertical transverse section illustrating a manner of weather-proofing the top and bottom of the cylindrical drum, while Fig. 5 is a detached perspective view of one of the water proofing devices.

The sections 1 and 2 of the articulated car are mounted on three trucks. In the present instance, the joint between the two sections is above the central truck. This truck carries the vestibule 4. The coupling of the two sections is in line with the pivotal center of the truck.

The vestibule 4 has two segmental walls extending from the floor to the roof of the car, between which walls is the passageway connecting the two sections of the car. These spaces 5 and 6 between the ends of the walls are sufficient to allow passengers to pass from one section of the car to the other section.

Each section of the car has end walls 7, 8, 9, and 10, respectively,—the edges of these sections terminating close to the wall of the vestibule.

In order to seal the joint between the walls of the vestibule and the edges of the ends of the car, wipers are provided. These wipers are the same on each of the four ends of the car sections. It is sufficient therefore, to describe the wiper arrangement on one of these ends. There are two distinct wipers on each car end wall. A vertical channel beam 37 is located at the inner edge of the car end, and secured to the beam is a bar 38 to which is attached a folded wiper 11 which is shown as a folded piece of sheet rubber or the like secured to the bar 38 by suitable means such as bolts 39 which extend through the clamp bar 40. A thin metallic spring 45 is located within the folded wiper and acts to hold the wiper lightly and yieldingly, but firmly against the wall of the vestibule. This spring is also held by the bolts 39.

In order to more effectually close the space between the vestibule and the car sections, a closing strip 30 is mounted on the outside of the car sections. This closing strip 30 is illustrated in Fig. 5, and comprises a strip of wood 46 enclosed by metal plates 47 and 48 and having the wiper 15 of rubber or other suitable material attached to the projecting edges thereof and arranged to lightly fold against the curved surface of the vestibule, as shown in Fig. 3.

The closing strip 30 is mounted between two vertical guide plates 35 and 36 extending from the roof to the floor of the car end.

Near each end of the closing strip 30 is a rod 26 having a head 29 located within the closing strip 30, the rod projecting through an opening in the rear end of the strip. At its outer end, the rod 26 is provided with an eye 49 through which passes a sleeve or other retaining means 50 supported at its ends by means of auxiliary plates 51 and 52 which are secured to the plates 47 and 48. The plates 51 and 52 abut at their outer end the strip of wood 46, and together with it are normally urged outwardly against the drum 4, under tension of the spring 28. This spring is shown as coiled about the shaft 26, and rests against the inner edge of the closing strip and against an abutment guide 27 which is secured by a nut 32 to the frame 31 which is shaped as shown in Fig. 3. The rod, as has been stated, preferably extends through a slot in this frame, and has at its end a stop washer or head of any suitable form. The frame 31, in the present instance, is made in two parts, the part 33 being secured to the guide plate 35 which is bent as shown. The other end of the frame is attached to the outer wall 19 of a housing which encloses the rod and spring, and to which is attached the outer guide 36 which is open as shown. Access may be had to the working part within the housing through a door 24 which as shown is hinged at 23 and provided with a latch 25. By the above construction, the closing strip can be readily detached and removed when desired.

The closing strips 30 will accommodate themselves to any movement of the sections in regard to the vestibule, keeping the joints tight under all conditions.

Provision is made for weather-proofing the top and bottom of the car in the manner shown in Fig. 4. Shown therein are the top 41 and the bottom 42 of the vestibule, and pressing thereagainst are the wipers 43 and 44 in the shape of segments of a circle, and carried in any suitable manner on the frame of the sections 1 and 2.

The wipers 43 and 44 will prevent any leakage of moisture from the top and bottom of the drums into the car interior, regardless of the angular position of the car sections with respect to the drum, while a similar function is performed by the wipers 11, 12, 13 and 14, and 15, 16, 17 and 18, as regards moisture from the sides of the drum.

As will be clearly understood, a double safe guard is afforded by the use of the plurality of wipers 11 and 15, the yieldingly mounted wiper 11 affording a perfect joint regardless of any movements of rod 26 to separate the wiper 15 from the vestibule 14, as a result of inertia or any other causes. Thus an articulated car is provided which is substantially impervious to the elements in so far as the articulated joint is concerned.

It is of course, understood that the invention is susceptible to numerous modifications and adaptations, and it is intended that it be limited only by the scope of the appended claims.

I claim:

1. The combination in an articulated car, of a car section; a vestibule section; and two closing strips carried by the car section and bearing against the walls of the vestibule section, one of the closing strips being in advance of the other, and one having means for forcing the closing strip against the vestibule section, and the other consisting of a strip yieldingly bearing against the vestibule section.

2. The combination in an articulated car, of a car section; a vestibule section; and two closing strips carried by the car section and bearing against the walls of the vestibule section, one of the closing strips being in advance of the other, and one having means for forcing the closing strip against the vestibule section, and the other consisting of a strip bearing against the vestibule section, the strip having a spring supporting element for causing it to yieldingly bear against the vestibule.

3. The combination in an articulated car, of car sections; a vestibule section arranged along the longitudinal center of said car; and two closing strips carried by each of the four end portions of adjacent ends of said car section, and bearing against the walls of the vestibule section, one of the closing strips being in advance of the other, and one having means for forcing the closing strip against the vestibule section, while the other consists of a strip yieldingly bearing against the vestibule section.

4. The combination in an articulated car, of car sections; a vestibule section arranged along the longitudinal center of said car; two closing strips carried by each of the four end portions of adjacent ends of said car section, each strip bearing against the walls of the vestibule section, one of the closing strips being in advance of the other, and one having cooperating means for forcing it against the vestibule section, while the other consists of a strip having a metal spring supporting element for causing it to yieldingly bear against the vestibule.

5. The combination in an articulated car, of a car section; a vestibule section; and a plurality of closing strips carried by the car section and bearing against the walls of said vestibule section, said strips extending substantially the full length of the vestibule section, one of said sections being urged against said drum by a coiled spring, while the other of said sections is mounted in advance of said previously mentioned strip and is yieldingly urged against the vestibule section by means of a spring supporting element.

6. In an articulated car having a car section and a vestibule section; two closing strips carried by the car section and bearing against the walls of the vestibule section, affording a double assurance against penetration of the elements to the car interior, the rearward of said strips being yieldingly urged against said vestibule section by means of a spring-controlled mechanism mounted in a frame on said car section, while the foremost of said strips is mounted directly on the car section and is yieldingly urged against said vestibule section by means of a spring supporting element, said foremost strip having a relatively larger area bearing against said vestibule section than does the rearwardly mounted strip.

7. In an articulated car having a plurality of car sections connected by a vestibule section, a plurality of vertically extending wipers mounted on each of said sections and yieldingly bearing against said vestibule section, and closing strips at the top and bottom of said sections, and also bearing against said vestibule section, the wipers closing the vestibule along its sides, while the last mentioned strips close it on its top and bottom.

8. In an articulated car, a car section, a vestibule, and a plurality of flexible wipers arranged one in advance of the other yieldingly bearing against said vestibule.

JAMES A. BROOKS.